Figure 1:
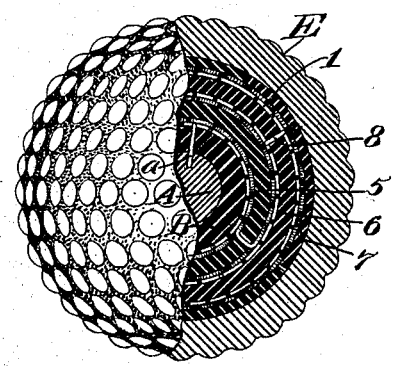

No. 716,348. Patented Dec. 16, 1902.
F. H. RICHARDS.
PLAYING BALL.
(Application filed Oct. 6, 1902.)
(No Model.)

Witnesses:

Inventor,
F. H. Richards.

UNITED STATES PATENT OFFICE.

FRANCIS H. RICHARDS, OF HARTFORD, CONNECTICUT, ASSIGNOR TO THE KEMPSHALL MANUFACTURING COMPANY, OF ARLINGTON, NEW JERSEY, A CORPORATION OF NEW JERSEY.

PLAYING-BALL.

SPECIFICATION forming part of Letters Patent No. 716,348, dated December 16, 1902.

Application filed October 6, 1902. Serial No. 126,022. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Playing-Balls, of which the following is a specification.

This invention, relating to playing-balls, and especially to those adapted for purposes of golf, has for its object to provide a construction whereby a great amount of power is stored up in the structure, thus giving to the ball a phenomenal flying power under a quick sharp blow and whereby also the ball may be dead under a light blow.

One form of my invention is illustrated in the drawings forming a part of this specification, in which—

Figure 2:
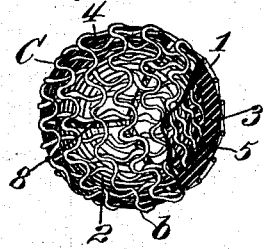
Figure 3:
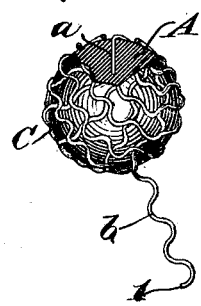
Figure 4:
Figure 5:
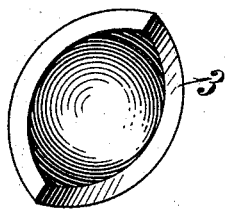

Figure 1 represents a ball partly broken away to show its construction. Fig. 2 illustrates the core of the ball partially built up. Fig. 3 illustrates the initial windings directly on a center piece. Fig. 4 shows a length of crimped wire, and Fig. 5 illustrates one of the members or pads used in building up the cores.

Like characters of reference indicate similar parts throughout the figures.

Upon a small center piece A, of any suitable material—such as gutta-percha, celluloid, or metal—I preferably apply a plastic layer B, such as soft rubber, and thereon wind continuously and in miscellaneous directions a wire 1, the end of which in the present instance is preferably inserted into said layer B and center piece A, as at $a$, in order to enable the winding to be more easily accomplished. As shown in Fig. 3, however, if desired, the initial winding may take place upon the center piece A direct instead of on the layer B, first covering said center piece. During the winding of the wire 1, forming a lattice-work C, I insert sections, pieces, or pads 2, 3, and 4 of a soft plastic material, preferably of soft rubber, which form layers 5, 6, and 7, of which the core is built. The pads or sections are of a size so that when applied to the spherical structure D they will leave spaces 8, through which the wire 1 may pass to be wound on the next succeeding layer. The wire 1, which may be straight, is preferably crimped, as at $b$, thus conducing to greater longitudinal elasticity, and as a result the wire may be more tightly drawn over each layer by a process of elongation and may more closely hug the layers. After the application of a sufficient number of the layers to properly size the core a shell E, preferably comprising hemispherical segments of plastic material, preferably celluloid or gutta-percha, is compressed upon said core and holds the latter in a high state of compression.

The normal resilience embodied in the soft-rubber sections or pads is supplemented by the resilience stored up in the springy wire. Owing to the latter being crimped or waved, phenomenal flying power is possessed by the structure. It will also be seen that by reason of the lateral space between the sections of each of the yielding layers room is given for lateral flow of the material when the ball is struck, thereby improving the liveliness of the ball. It will also be noted that the continuous wire wound in miscellaneous directions builds up a lattice-work into and throughout which are incorporated pads or sections of yielding elastic material.

It is to be understood that for convenience a plurality of layers of soft plastic material, such as rubber, are shown and described. It is obvious, however, that within the scope of this invention various kinds of material may be employed or a harder layer may alternate with soft layers—for instance, soft rubber alternating with gutta-percha; also, that the initial windings may take place upon the center piece instead of on the first layer inclosing said center piece, as shown, for instance, in Fig. 3.

Various other materials and arrangement of parts may be resorted to within the scope of this invention.

Having described my invention, I claim—

1. A playing-ball comprising a core built up of a continuous winding of wire, and rubber pads, being held to the center piece by said wire, and a shell of plastic material inclosing said core.

2. A playing-ball comprising a core built up of windings of wire, and rubber pads, being held to the center piece by said wire, and a shell of gutta-percha inclosing said core.

3. A playing-ball comprising a center piece, crimped wire wound thereon in miscellaneous directions, and pieces of rubber bound to said center piece by the windings.

4. A playing-ball comprising a center piece, crimped wire wound thereon in miscellaneous directions to form a lattice-work, and a plurality of layers of rubber bound to said center piece by said lattice-work.

5. A playing-ball comprising a solid center piece, a crimped wire wound thereon in various directions, pads interspersed between said windings and which form the successive layers of the core, and a shell of plastic material holding said core under compression.

6. A playing-ball comprising a center piece, an extensible springy wire wound thereon in various directions and forming a lattice-work, pads interspersed between said lattice-work and which form layers of the core, and a shell of plastic material compressed on said core.

7. A playing-ball comprising a springy center piece, a crimped wire wound continuously thereon in various directions, pieces of elastic material interspersed between said windings and which form the successive layers of the core, and a cover.

8. A playing-ball comprising a center piece, a crimped wire wound continuously thereon in various directions, sections of rubber interspersed between said windings and which form the successive layers of the core, and a shell of gutta-percha.

9. A playing-ball comprising a small center piece, crimped wire wound thereon promiscuously under tension and forming a lattice-work, sections of soft rubber interspersed throughout said lattice-work and forming a core, and a plastic shell thereon.

10. A playing-ball comprising a small center piece, crimped wire wound thereon promiscuously and forming a lattice-work, sections of plastic material interspersed throughout said lattice-work and forming a core, and a gutta-percha shell holding said core under compression.

11. A playing-ball comprising a small center piece, crimped wire wound thereon in miscellaneous directions and under high tension and forming a lattice-work, sections of plastic material interspersed throughout said lattice-work and which form a core, and a cover.

12. A playing-ball comprising a spherical body of soft rubber, a crimped wire continuously wound thereon under high tension and forming a lattice-work, sections of soft rubber interspersed throughout said lattice-work and forming a core, and a shell of gutta-percha inclosing said core.

13. A playing-ball comprising a spherical body of soft rubber, a crimped wire continuously wound thereon under high tension and forming a lattice-work, and a cover.

14. A playing-ball, a portion whereof comprises a core built up of sections of plastic material, and a wire wound in miscellaneous directions to hold said sections together to form the core, said wire passing between said sections.

15. A playing-ball, a portion whereof comprises a core built up of sections of soft rubber, a wire wound in miscellaneous directions and holding said sections together and forming the core, said wire passing between said sections.

16. A playing-ball comprising a core built up of sections of plastic material, a crimped wire wound in miscellaneous directions and holding said sections together to form a core, said wire passing between the various sections and continuously around the core.

17. A playing-ball comprising a hard center piece, a plurality of layers thereon of plastic material, each layer consisting of sections, tense windings of resilient wire upon each of said layers, and a cover.

18. A playing-ball comprising a hard center piece, a plurality of layers thereon of soft rubber, each layer consisting of sections, tense windings of resilient wire upon each of said layers, and a cover.

19. A playing-ball comprising a spherical body of springy material, tense windings thereon in miscellaneous directions of crimped resilient wire, and a cover.

20. A playing-ball comprising a plurality of spherical bodies or layers of soft rubber, tense windings upon each of said bodies of crimped resilient wire, and a cover.

21. A playing-ball comprising a plurality of layers of springy material, tense windings upon each of said layers of crimped resilient wire, and a cover.

22. A playing-ball comprising a built-up core consisting at least partially of sections of plastic material, miscellaneous windings of binding material which hold said sections together, said binding material passing between said sections, and a cover.

23. A playing-ball comprising a built-up core consisting at least partially of sections of soft rubber, tense windings in miscellaneous directions thereon of longitudinally-elastic material, said windings passing between said sections, and a cover.

Signed at 9 to 15 Murray street, New York, in the county and State of New York.

FRANCIS H. RICHARDS.

Witnesses:
F. W. BARNACLO,
FRED. J. DOLE.